US010230575B2

(12) United States Patent
Oommen et al.

(10) Patent No.: US 10,230,575 B2

(45) Date of Patent: Mar. 12, 2019

(54) METHOD AND APPARATUS FOR ON-DEMAND CLIENT-INITIATED PROVISIONING

(71) Applicant: Nokia Technologies Oy, Espoo (FI)

(72) Inventors: Paul Oommen, Sunnyvale, CA (US); Gabor Bajko, Sunnyvale, CA (US)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/291,774

(22) Filed: Oct. 12, 2016

(65) Prior Publication Data

US 2017/0099184 A1 Apr. 6, 2017

Related U.S. Application Data

(63) Continuation of application No. 13/074,874, filed on Mar. 29, 2011, now abandoned.

(60) Provisional application No. 61/440,262, filed on Feb. 7, 2011.

(51) Int. Cl.
*H04L 12/24* (2006.01)

(52) U.S. Cl.
CPC ................................ *H04L 41/0809* (2013.01)

(58) Field of Classification Search
CPC ...... H04L 41/0809; H04W 48/18; H04W 8/24
See application file for complete search history.

(56) References Cited

U.S. PATENT DOCUMENTS 5,774,689 A 6/1998 Curtis et al.
6,647,260 B2 11/2003 Dusse et al.
6,947,989 B2 9/2005 Gullotta et al.
7,069,344 B2 6/2006 Carolan et al.
8,320,388 B2 11/2012 Louati et al.
8,989,806 B2 * 3/2015 Brusilovsky ............ H04W 4/70 455/552.1
2002/0147801 A1 10/2002 Gullotta et al.
2003/0101246 A1 5/2003 Lahti (Continued)

FOREIGN PATENT DOCUMENTS

EP 1043906 A2 10/2000
MX PA05001360 5/2005

(Continued)

OTHER PUBLICATIONS

Extended European Search Report for related European Patent Application No. 12744937.9, dated Dec. 12, 2014, 6 Pages.

(Continued)

*Primary Examiner* — Ian N Moore
*Assistant Examiner* — Latresa McCallum
(74) *Attorney, Agent, or Firm* — Ditthavong & Steiner, P.C.

(57) ABSTRACT

An approach is presented for client initiated provisioning. A provisioning manager determines a client-based trigger for requesting a provisioning of a client device to access a network. The provisioning manager processes and/or facilitates a processing of the client-based trigger to generate a provisioning request, and then causes, at least in part, transmission of the provisioning request to a provisioning server associated with the network. The provisioning manager receives provisioning information from the provisioning server for processing to gain access to the network.

18 Claims, 9 Drawing Sheets

300
START
301 DETERMINE A CLIENT-BASED TRIGGER FOR PROVISIONING ACCESS TO A NETWORK
303 GENERATE A PROVISIONING REQUEST
305 ESTABLISH A CONNECTION WITH A PROVISIONING SERVER
307 AUTHENTICATION OK?
NO
YES
309 TRANSMIT PROVISIONING REQUEST
311 RECEIVE PROVISIONING INFORMATION
313 PROCESS PROVISIONING INFORMATION TO DIRECT BROWSER TO REGISTRATION URI
315 EXCHANGE REGISTRATION INFORMATION
317 PROCESS PROVISIONING AND/OR REGISTRATION INFO TO GAIN ACCESS TO THE NETWORK
END

(56) References Cited

U.S. PATENT DOCUMENTS

2003/0133421 A1* 7/2003 Sundar .................... H04W 4/00 370/328
2005/0213507 A1 9/2005 Banerjee et al.
2005/0228874 A1 10/2005 Edgett et al.
2006/0047814 A1 3/2006 Batz et al.
2006/0268835 A1* 11/2006 Hyotylainen ........... H04L 67/14 370/352
2007/0043860 A1 2/2007 Pabari
2007/0094691 A1* 4/2007 Gazdzinski ........ H04N 7/17318 725/62
2008/0260149 A1 10/2008 Gehrmann
2009/0068999 A1 3/2009 Chen et al.
2009/0205028 A1 8/2009 Smeets et al.
2009/0245206 A1* 10/2009 Liu ................... H04W 36/0055 370/331
2010/0023603 A1 1/2010 Archer et al.
2010/0046531 A1 2/2010 Louati et al.
2010/0106967 A1 4/2010 Johansson et al.
2010/0110890 A1* 5/2010 Rainer .................. H04M 15/00 370/232
2010/0184440 A1* 7/2010 Mao ...................... H04W 48/18 455/437
2010/0190475 A1* 7/2010 El-Kadri ................. H04L 67/26 455/412.2
2011/0004549 A1 1/2011 Gray et al.
2011/0004654 A1 1/2011 Tasa et al.
2011/0047373 A1 2/2011 Karasawa et al.
2011/0070877 A1* 3/2011 Macaluso ......... H04M 1/72525 455/419
2011/0093367 A1 4/2011 Stapleton
2011/0286437 A1* 11/2011 Austin .................... H04W 4/02 370/338
2012/0203824 A1 8/2012 Oommen

FOREIGN PATENT DOCUMENTS

WO 2005086468 A1 9/2005
WO 2009092115 A2 7/2009
WO 2010022826 A1 3/2010

OTHER PUBLICATIONS

International Seach Report of the International Searching Authority for International Application No. PCT/FI2012/050108, dated May 11, 2012, 10 pages.
International Search Report of the International Searching Authority for International Application No. PCT/FI2012/050108, dated May 11, 2012, 5 pages.
Husain et al., “Remote Device Management of WiMAX Devices in Multi-Mode Multi-Access Environment”, IEEE International Symposium on Broadband Multimedia Systems and Broadcasting, Mar. 31, 2008, 14 Pages.
Office Action for related European Patent Application No. 12 744 937.9-1213, dated Jan. 12, 2018, 4 pages.
Office Action for the related European Patent Application No. 12744937.9-1213, dated Nov. 20, 2018, 4 pages.

* cited by examiner

100
USER EQUIPMENT 101
PROVISIONING MANAGER 105
BROWSER APPLICATION 107
PROVISIONING SERVER 109a
PROVISIONING SERVER 109n
COMMUNICATION NETWORK 103a
COMMUNICATION NETWORK 103n
SERVICE PLATFORM 111
SERVICE 113a
SERVICE 113m
DATA PROVIDER 115a
DATA PROVIDER 115k

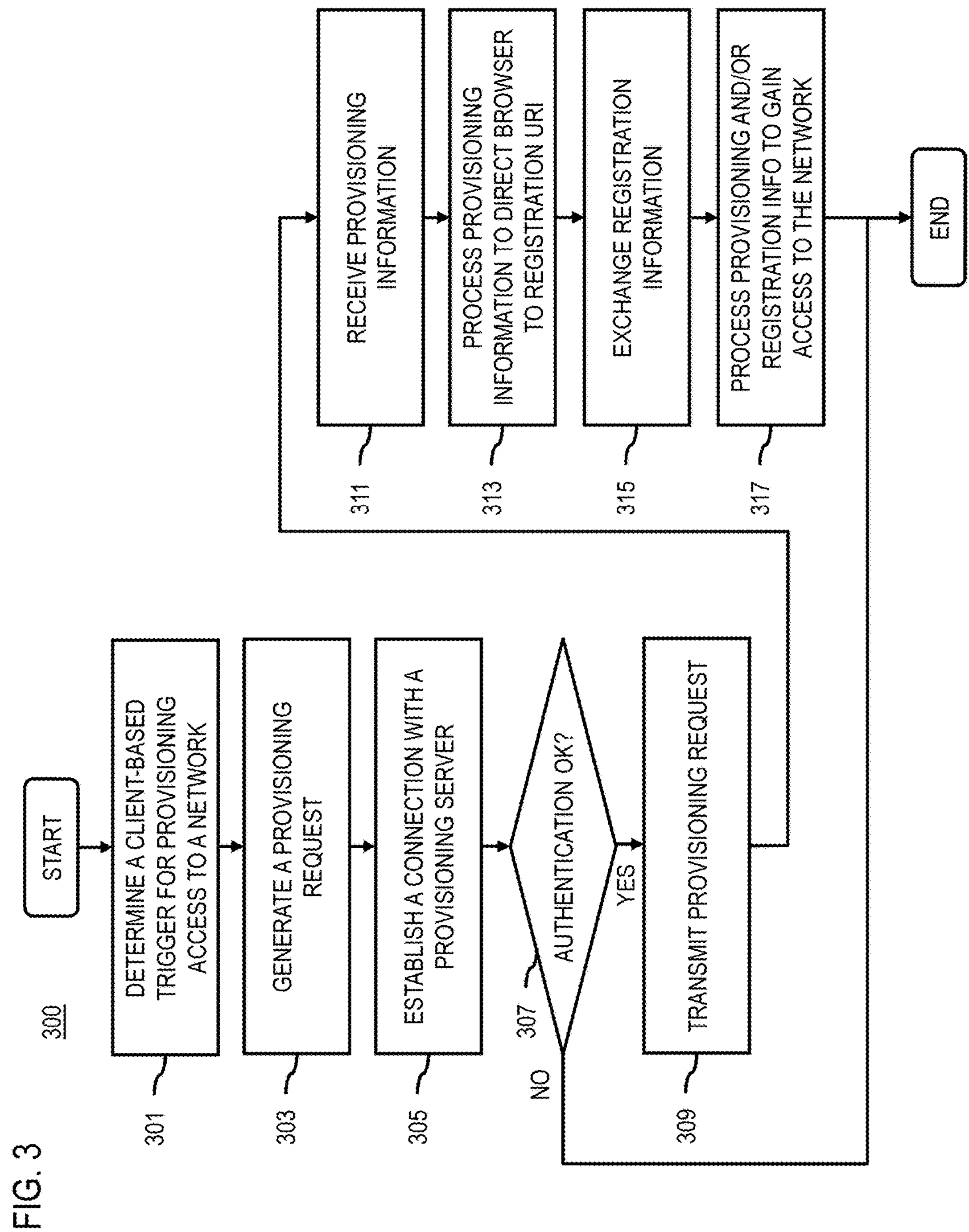

FIG. 3
300
START
301
DETERMINE A CLIENT-BASED TRIGGER FOR PROVISIONING ACCESS TO A NETWORK
303
GENERATE A PROVISIONING REQUEST
305
ESTABLISH A CONNECTION WITH A PROVISIONING SERVER
307
AUTHENTICATION OK?
YES
NO
309
TRANSMIT PROVISIONING REQUEST
311
RECEIVE PROVISIONING INFORMATION
313
PROCESS PROVISIONING INFORMATION TO DIRECT BROWSER TO REGISTRATION URI
315
EXCHANGE REGISTRATION INFORMATION
317
PROCESS PROVISIONING AND/OR REGISTRATION INFO TO GAIN ACCESS TO THE NETWORK
END

520

500

MOBILE TERMINAL
801
817
835
821
Duplexer
837
LNA
819
PA
833
839
Down-Converter
Synthesizer
Up-Converter
831
Battery Interface & Power Control
820
841
Demodulator
RF Interface
Modulator
827
815
829
825
Equalizer
847
807
849
Keyboard
Display
SIM Card
805
DSP
MCU
803
ASIC BACKPLANE
843
AUDIO INTERFACE
CODEC
DAC
ADC
845
811
809
813
823
MEMORY
851

METHOD AND APPARATUS FOR ON-DEMAND CLIENT-INITIATED PROVISIONING

RELATED APPLICATIONS

This application is a continuation of U.S. patent application Ser. No. 13/074,874, filed Mar. 29, 2011, entitled "Method and Apparatus for On-Demand Client-Initiated Provisioning", which claims the benefit of the earlier filing date under 35 U.S.C. § 119(e) of U.S. Provisional Application Ser. No. 61/440,262 filed Feb. 7, 2011, entitled "Method and Apparatus for On-Demand Client-Initiated Provisioning," which are each hereby incorporated by reference herein in their entireties.

BACKGROUND

Service providers and device manufacturers (e.g., wireless, cellular, etc.) are continually challenged to deliver value and convenience to consumers by, for example, providing compelling network devices and services. One area of development of has been the provisioning of devices for access to one or more networks and/or the services available over those networks. Traditionally, such provisioning processes have been initiated or controlled by a network server or other server-side component. In other traditional approaches, at least some network or server specific information is preconfigured in a device (e.g., customized provisioning information retrieved using, for instance, preconfigured uniform resource identifiers (URIs)). However, as network environments become more varied, access to provisioning servers or preconfigured provisioning information may be limited or otherwise unavailable. Accordingly, service providers and device manufacturers face significant challenges to facilitating the provisioning process in such environments.

SOME EXAMPLE EMBODIMENTS

Therefore, there is a need for an approach for on-demand client-based provisioning, particularly in cases where the devices have no prior information about the network (e.g., when there is no subscription, prior relationship, and/or previously established policies between the device and the network/service provider.

According to one embodiment, a method comprises determining a client-based trigger for requesting a provisioning of a client device to access a network. The method also comprises processing and/or facilitating a processing of the client-based trigger to generate a provisioning request. The method further comprises determining network provisioning information based, at least in part, on the provisioning request. The method further comprises processing and/or facilitating a processing of the network provisioning information to gain access to the network.

According to another embodiment, an apparatus comprises at least one processor, and at least one memory including computer program code, the at least one memory and the computer program code configured to, with the at least one processor, cause, at least in part, the apparatus to determine a client-based trigger for requesting a provisioning of a client device to access a network. The apparatus is also caused to process and/or facilitate a processing of the client-based trigger to generate a provisioning request. The method is further caused to determine network provisioning information based, at least in part, on the provisioning request. The method is further caused to process and/or facilitate a processing of the network provisioning information to gain access to the network.

According to another embodiment, a computer-readable storage medium carries one or more sequences of one or more instructions which, when executed by one or more processors, cause, at least in part, an apparatus to determine a client-based trigger for requesting a provisioning of a client device to access a network. The apparatus is also caused to process and/or facilitate a processing of the client-based trigger to generate a provisioning request. The method is further caused to determine network provisioning information based, at least in part, on the provisioning request. The method is further caused to process and/or facilitate a processing of the network provisioning information to gain access to the network.

According to another embodiment, an apparatus comprises means for determining a client-based trigger for requesting a provisioning of a client device to access a network. The apparatus also comprises means for processing and/or facilitating a processing of the client-based trigger to generate a provisioning request. The apparatus further comprises means for determining network provisioning information from the provisioning server. The apparatus further comprises means for processing and/or facilitating a processing of the network provisioning information to gain access to the network In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (including derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of the originally filed claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 3 is a flowchart of a process for client-initiated provisioning, according to one embodiment;

DESCRIPTION OF SOME EMBODIMENTS

Examples of a method, apparatus, and computer program for client-initiated provisioning are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
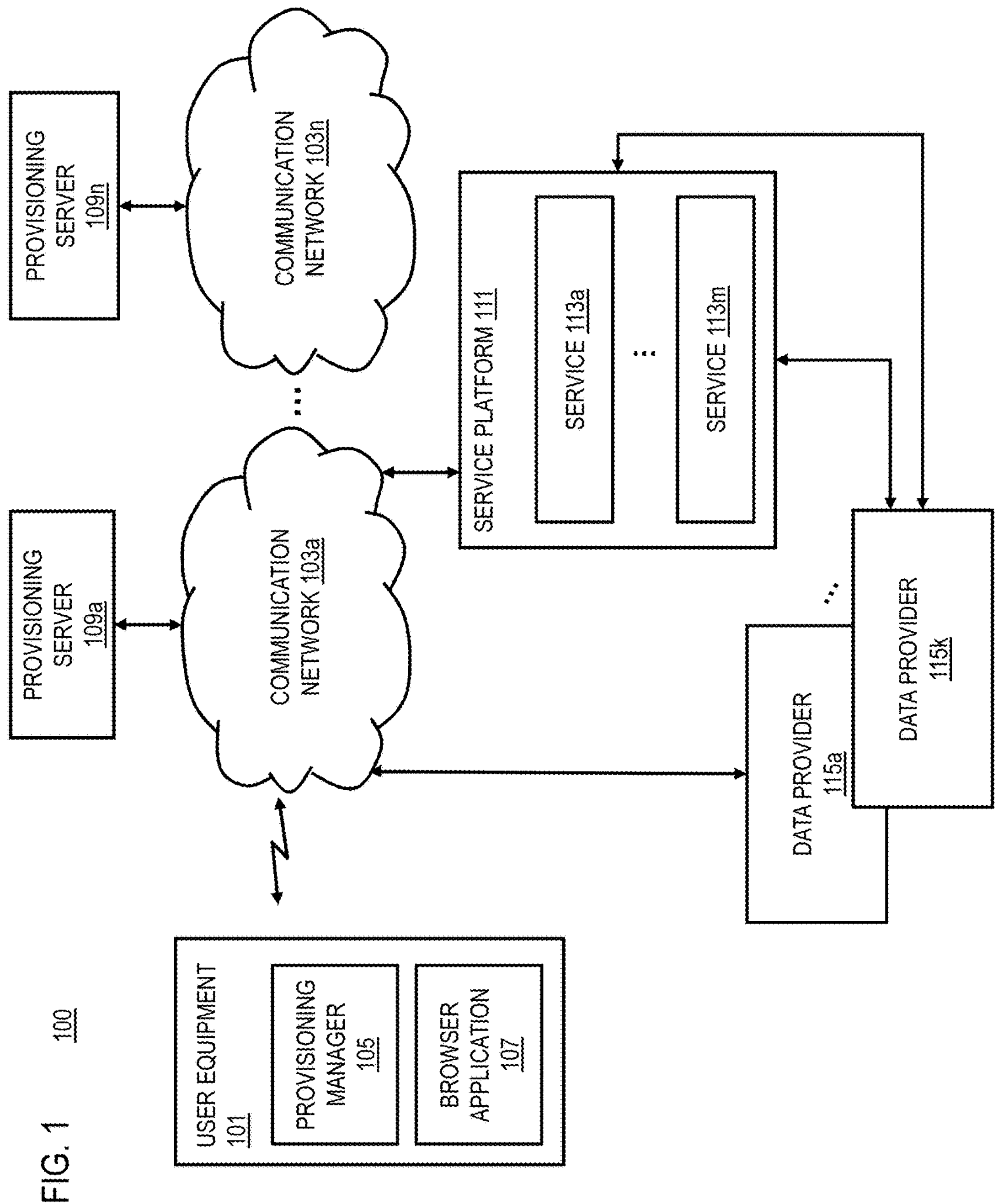
FIG. 1 is a diagram of a system capable of client-initiate provisioning, according to one embodiment.

FIG. 1 is a diagram of a system capable of client-initiated provisioning, according to one embodiment. Historically, devices (e.g., those sold through operator channels) are provisioned through network initiated (e.g., cellular-network initiated global system for mobile communications (GSM)/ code division multiple access (CDMA) provisioning) procedures, through in-store provisioning, or through connecting to a host terminal (e.g., when provisioning or activity a smart phone through a personal computer (PC)). In other words, operators generally provision devices for service in their networks through network initiated procedures or otherwise use closed ecosystems with PC connectivity to configure the devices for service. However, in some scenarios, network-triggered initiation of session to provision a device for service in a network may not always be possible. For example, when smartphones and other network capable consumer devices or gadgets are purchased in the retail market (e.g., not supplied through operator channels), a retailer with no direct operator affiliation (e.g., an independent electronics shop) may not have access to network portals or representatives to perform the traditional network-initiated provisioning. Moreover, such devices can typically support different access technologies (e.g., cellular, WiFi, Cognitive Radio, etc.) for service in a variety of networks.

Another example where network-initiated provisioning is not possible or otherwise not practical is Machine to Machine (M2M) devices, which is an emerging trend. By way of example, M2M devices provide for direct communications between devices (e.g., computer, smartphones, sensors, etc.) for automated sharing of data to support, for instance, telemetry applications, remote sensing applications, process monitoring and control, etc. For example, there can be a large number of M2M devices behind a Gateway or served by the Gateway, that manage communications between the M2M devices and outside networks. Accordingly, a Server in the Internet (e.g., a provisioning server) would not be able to reach the M2M devices directly to initiate a provisioning process to access and register for service with a network.

As a result, if the provisioning server of a network is unable to directly connect to a device for provisioning, the network will not be able to initiate the provisioning process. Particularly when the device has not been previously configured with network provisioning information or if the preconfigured network provisioning information in the device is outdated, the client device would have no knowledge of the provisioning procedures for accessing a particular network.

To address this problem, a system 100 of FIG. 1 introduces a generic mechanism for client initiated provisioning that is applicable to provisioning service for a variety of networks and/or service providers. In one embodiment, the various embodiments of the approach described herein are related to provisioning of service in a consumer mobile device. However, it is contemplated that the various embodiments described herein are also applicable to client-initiated provisioning any device for service with any available network or service provider. By way of example, this device can be purchased or obtained in the retail market, and the user is free to choose a desired network/operator, select a plan and subscribe for service directly from device (e.g., the client device) to a client-initiated process. Moreover, the various embodiments of the client-initiated processes described herein enable the client device to request provisioning "on demand" or only when network access is requested by the client device. In this way, resources need not be used to provision access to networks that the client device does not yet intend to access.

In one embodiment, the mechanism leverages, for instance, the Open Mobile Alliance (OMA) Device Management (DM) standards and network specific protocols. More specifically, in one embodiment, the system 100 determines a client-based trigger (e.g., a network access attempt) for requesting a provisioning of a client device with a subscription or only credentials, used to access an available network. For example, the system 100 (e.g., at the client device seeking provisioning) determines networks available to the client device and presents the networks in, for instance, a user interface of the client device for selection by a user. In one embodiment, the system 100 detects available networks in a location through mechanisms native to the network technology. For example, in WiFi network, a service set identifier (SSID) is periodically broadcasted in a beacon transmission. The system 100 can then detect the SSID from the beacon transmission for presentation in the user interface of the client device. Similar network specific mechanism can be utilized in other types of networks. In other words, the client-based trigger can be generated based on a user selecting a desired network through the user interface. In addition or alternatively, the trigger can be automatically generated or generated based on user specified preferences (e.g., a preference to always join an available network). On selecting an available network to provision, the client device generates a provisioning request. The request may, for instance, include at least in part information on the capabilities, configuration, etc., of the device (e.g., operating system, memory, processor, firmware, hardware capabilities, etc.).

In one embodiment, the network or network access point can terminate the provisioning request to a provisioning server. The client device then initiates a connection with a provisioning server associated with the network (e.g., through OMA DM and standard communication protocols such as an Internet Transport Layer Security (TLS) based network connection) for transmission of the request. In one embodiment, an authentication process can be performed to ensure that the device is communicating with an authorized provisioning server before the client device initiates the provisioning request (e.g., the client device can validate a root certificate of the provisioning server for security).

In response, the provisioning service can send provisioning and/or registration information to the client device that provides, for instance, information on how to register and configure service with the network or service provider. In one embodiment, the provisioning and/or registration information can be transmitted through OMA DM protocols or other means such as hypertext transport protocol (HTTP)/hypertext transport protocol secure (HTTPS), simple object access protocol (SOAP), universal plug and play device manager (UPnP DM), TR-069 remote management, extensible markup language (XML), JavaScript, JavaScript object notation (JSON), and the like. In addition or alternatively, the provisioning server can create and store the requested provisioning information. In this case, the provisioning service can send the location of the provisioning information (e.g., as a URI or URN) which can be used by the client device to fetch the provisioning information. The client device can then process the information to complete the provisioning process to gain access to the network.

In another embodiment, during the provisioning process, the system 100 can invoke another process in the device based, at least in part, on information and/or commands provided in the received provisioning information. For example, the server can include in the provisioning information a URI to a registration page and an "Exec" command to launch a browser application at the client device and direct the browser application to the registration page. In one embodiment, the user may be requested to provide user specific information (e.g., name, address, service level, payment, etc.) to facilitate the provisioning process. After entering the registration information, the browser application terminates to continue the provisioning process.

In this way, the system 100 can simplify and reduce the resource burden associated with provisioning various devices when network-initiated provisioning processes are not possible, not practical, or otherwise not selected. In particular, provisioning processes for devices (e.g., M2M devices, smartphones, etc.) with different access technologies can be simplified relative to traditional operator originated provisioning. In the case of PC hosted provisioning, the various embodiments described bypass the PC intermediary to reduce resources associated with maintaining a PC-assisted provisioning process.

As shown in FIG. 1, the system 100 comprises at least one user equipment 101 (e.g., a client device) with connectivity to one or more available communication networks 103*a*-103*n* (also collectively referred to as communication networks 103). As shown, the UE 101 has includes a provisioning manager 105 to facilitate client-initiated provisioning as discussed with respect to the various embodiments described herein. To support the client-initiated provisioning process, the provisioning manager 105 may interact with a browser application 107 to present information and a user interface for controlling or presenting various portions of the client-initiated provisioning process.

In this example, the provisioning manager 105 and/or the UE 101 also have connectivity to the respective provisioning servers 109*a*-109*n* (also collectively referred to as provisioning servers 109) of the communication networks 103*a*-103*n*. In one embodiment, the connectivity of the provisioning servers 109*a*-109*n* can occur through the respective communication networks 103*a*-103*n* using, for instance, OMA DM and TLS protocols.

In one embodiment, the source of the provisioning and/or registration information provided by the provisioning servers 109 may be the service platform 111, the one or more services 113*a*-113*m* of the service platform 111, the one or more data providers 115*a*-115*k*, and/or other data services available over the communication networks 103. For example, a service 113*a* may obtain provisioning or registration data (e.g., notification messages or media content) from a data provider 111*a* to deliver the obtained data to the provisioning servers 109, the provisioning manager 105, the browser application 107, and/or the UE 101.

In another embodiment, each of the services 113*a*-113*m*, for instance, may provide different content and/or different types of services (e.g., a social networking service, a messaging service or a music service) that may be independently or collectively provisioned according to the various embodiments described herein. In yet another embodiment, access to the communication networks 103 and/or one or more of the services 113*a*-113*m* may be provided with a different quality of service (e.g., guaranteed throughput) based on the service level agreement made during the provisioning process.

By way of example, the communication networks 103 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), WiFi HotSpots, wireless LAN (WLAN), Bluetooth®, Internet Protocol (IP) data casting, satellite, mobile ad-hoc network (MANET), cognitive radio, Television White Spaces, and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.). In some embodiments, the UE 101 can also be an M2M device.

Communication is facilitated between the UE 101, the communication networks 103, the provisioning servers 109, and other components of the system 100 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

In one embodiment, the provisioning manager 105 and the provisioning servers 109 interact according to a client-server model. It is noted that the client-server model of computer process interaction is widely known and used. According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others.

Figure 2:
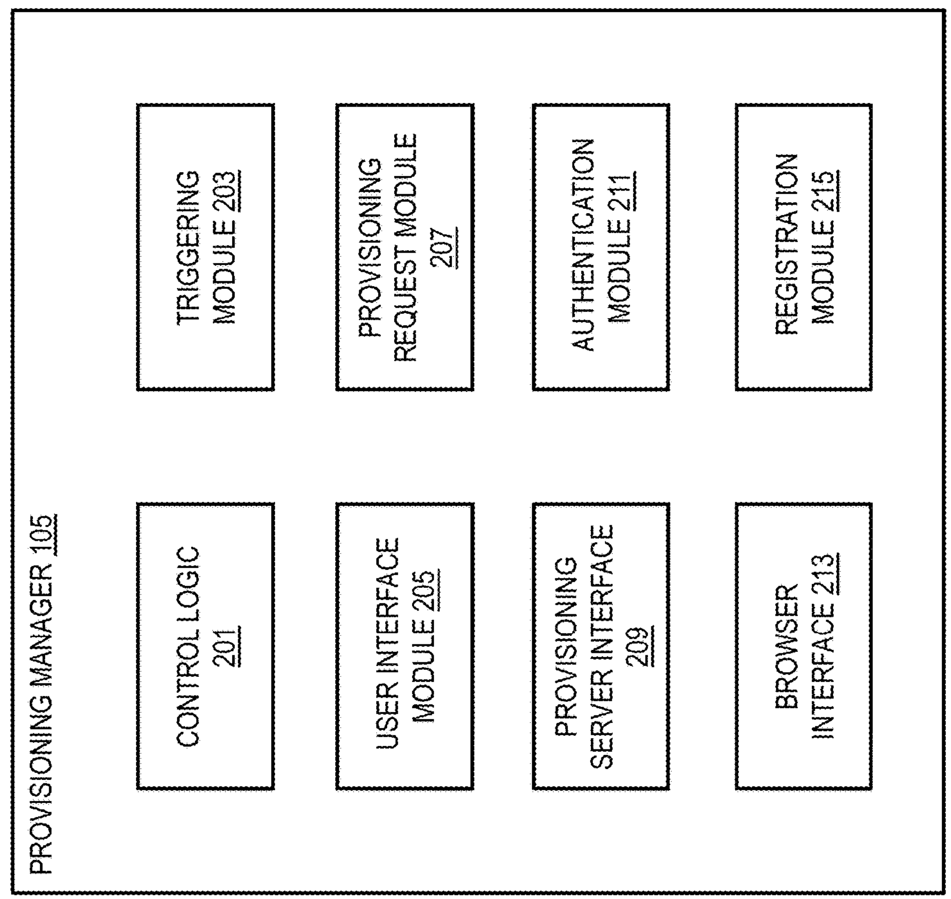
FIG. 2 is a diagram of the components of a provisioning manager, according to one embodiment.

FIG. 2 is a diagram of the components of a provisioning manager 105, according to one embodiment. By way of example, the provisioning manager 105 includes one or more components for client-initiated provisioning. It is contemplated that the functions of these components may be combined in one or more components or performed by other components of equivalent functionality. In this embodiment, the provisioning manager 105 includes at least a control logic 201 which executes at least one algorithm for performing functions of the provisioning manager 105. For example, the control logic 201 interacts with a triggering module 105 to determine one or more events for initiating a provisioning request to one or more provisioning servers 109 of the communication networks 103. In one embodiment, the triggering module 203 can interact with the user interface module 205 to present a list of communications networks 103 that are available for provisioning. By way of example, the triggering module 203 can interact with the wireless radios or interfaces of the UE 101 to detect the networks 103 (e.g., scan for available WiFi access points, cellular networks, Cognitive Radio, or other networks).

In some embodiments, the triggering event can be determined based on an attempted access to an available communication network 103. For example, if the UE 101 attempts to connect to a WiFi access point for which it has not been provisioned, the triggering module 203 can interpret the connection attempt as a provisioning triggering event.

On detecting a triggering event, the triggering module 203 (e.g., acting on the UE 101 client device) interacts with the provisioning request module 207 to generate a request for provisioning of service for the requested network 103 and/or related service provider, service 115, etc. of the network 103. In one embodiment, the request includes information regarding the identity, characteristics, capabilities, etc. of the UE 101 to indicate specific provisioning requirements or parameters.

The provisioning server interface 209 then attempts to establish a connection with the respective provisioning server 109 for transmission of the client-initiated provisioning request. As previously noted, the connection can be established using OMA DM and TLS protocols. For example, the provisioning server interface 209 may be allowed to make at least a temporary or otherwise restricted connection via an unprovisioned network 103 for the purposes of initiating a provisioning and/or service registration process. It is contemplated that the provisioning server interface 209 may also use any other communication protocol or communication channel to connect with the provisioning server 109. For example, if the UE 101 has any other previously provisioned network 103 active, that network 103 may be used to connection with the provisioning server 109 of subsequent networks 103.

After establishing the connection, the authentication module 211 can attempt to authenticate the provisioning server 109 to ensure that the server 109 is authorized to accept provisioning requests and providing provisioning information for the communication network 103. In one embodiment, the authentication may include verifying security or authentication certificates associated with the server 109. It is contemplated that any authentication process can be used to verify the identity of the provisioning server 109. If authentication is successful, the authentication module 211 notifies the provisioning request module 207 to initiate transmission of the provisioning request over the connection established through the provisioning server interface 209.

In response, the provisioning request module 207 receives provisioning information from the provisioning server 103 to indicate, for instance, registration information and/or procedures for provisioning. The provisioning request module 207 can then interact with the browser interface 213 to present all or a portion of the provisioning information in, for instance, the web application 107 of the UE 101. In addition or alternatively, it is contemplated that the provisioning may also be presented at any other application (e.g., a client application) or process executing on the UE 101. By way of example, the information presented at the browser application 107 may include a description of the network 103, service agreements, service plans, payment information, account information, etc. associated with the network 103. In one embodiment, the user can also make selections of the various service options via the browser application 107. Based on responses collected from, for instance, the browser application 107, the registration module 215 exchanges registration information with the provisioning server 109 to complete the client-initiated provisioning process to gain access to the communication network 103.

FIG. 3 is a flowchart of a process for client-initiated provisioning, according to one embodiment. In one embodiment, the provisioning manager 105 performs the process 300 and is implemented in, for instance, a chip set including a processor and a memory as shown in FIG. 7 or computer system of FIG. 6. In step 301, the provisioning manager 105 determines a client-based trigger for requesting a provisioning of a client device (e.g., a UE 101 or M2M device) to access a network 103. In one embodiment, the network is a data network including, at least in part, a cellular network, a local area network, a wireless local area network, a proprietary packet-switched network, or a combination thereof. In some cases, the client device 101 has or includes no prior information related to a provisioning of the network 103. In another embodiment, the client-based trigger includes, at least in part, an attempt by the client device 101 to access the network 103. By way of example, the attempt can be initiated by selecting from a list of available networks 103 through a user interface of the client device 101.

In step 303, the provisioning manager 103 processes and/or facilitates a processing of the client-based trigger to generate a provisioning request. In one embodiment, the processing includes, at least in part, retrieval information about the characteristics, capabilities, etc. of the device as described above. This information is then included in the provisioning request. In another embodiment, the provisioning manager 103 determines to include metadata in the client-based trigger, the provisioning request, or a combination thereof. By way of example, the metadata provides, at least in part, information on a purpose of the client-based trigger, the provisioning request, or a combination thereof. The metadata may also be specified in a standardized format that is, for instance, known to both the provisioning manager 105 and the provisioning server 109.

In step 305, the provisioning manager 103, causes, at least in part, creation of a connection between the client device and the provisioning server. In one embodiment, the provisioning manager 103 also causes, at least in part, determination of authentication credentials over the connection, wherein the provisioning is based, at least in part, on the authentication. In one embodiment, the authentication credentials support server-side authentication. In other words, the provisioning manager 105 determines whether the authentication process has been successful (step 307). If the authentication is not successful the client-initiated provisioning process ends.

If the authentication process is successful, the provisioning manager 105 causes, at least in part, transmission of the provisioning request to a provisioning server associated with the network 103 (step 309). In response to the request, the provisioning manager 105 receives provisioning information from the provisioning server 109 (step 311). In one embodiment, the provisioning information includes, at least in part, a registration universal resource identifier (URI) and a command (e.g., an OMA DM Exec command to launch a browser application 107 to the registration URI). In this case, the provisioning server 109 causes at least in part, directing of a browser application 107 executing at the client device 101 to the registration URI for display of the related provisioning and/or registration information (step 313).

The provisioning manager 105 then causes, at least in part, exchanging of registration data between the client device 101 and the provisioning server 109 through the browser application 107 (step 315). In one embodiment, the registration data includes, at least in part, identity information of the client device, identity information of a user of the client device, a selection of a rate plan, account information, payment information, or a combination thereof. In one embodiment, the registration information is provided, at least in part, as one or more web-based standards (e.g., HTTP, HTTPS, JSON, JavaScript, XML, OMA DM managed objects (MOs), etc.). The provisioning manager 105 then processes and/or facilitates a processing of the provisioning and/or registration information to gain access to the network 103 and complete the client-initiated provisioning process (step 317). In addition or alternatively, the provisioning and/or registration information may be used to gain access to one or more services 113 of the network 103.

In another embodiment, the provisioning information may include information status information with respect to creation of subscription information for access to the network 103. Moreover, instead of including the subscription information itself in the provisioning information sent to the provisioning manager 105, the provisioning server 105 may instead send a location of the subscription information (e.g., a URI associated with the subscription information). The provisioning manager 105 then causes, at least in part, retrieval of the subscription information from the location to gain access to the network.

In yet another embodiment, it is contemplated that the provisioning manager 105 and/or the provisioning server 109 may not be able to complete the provisioning process in one session. In this case, the provisioning manager 105 can determine to associate the client-based trigger, the provisioning request, the network provisioning information, or a combination thereof with at least one correlation identifier. The correlation identifier facilitates identification of the client-based trigger, the provisioning request, the network provisioning information, or a combination thereof across a plurality of provisioning sessions.

Figure 4:
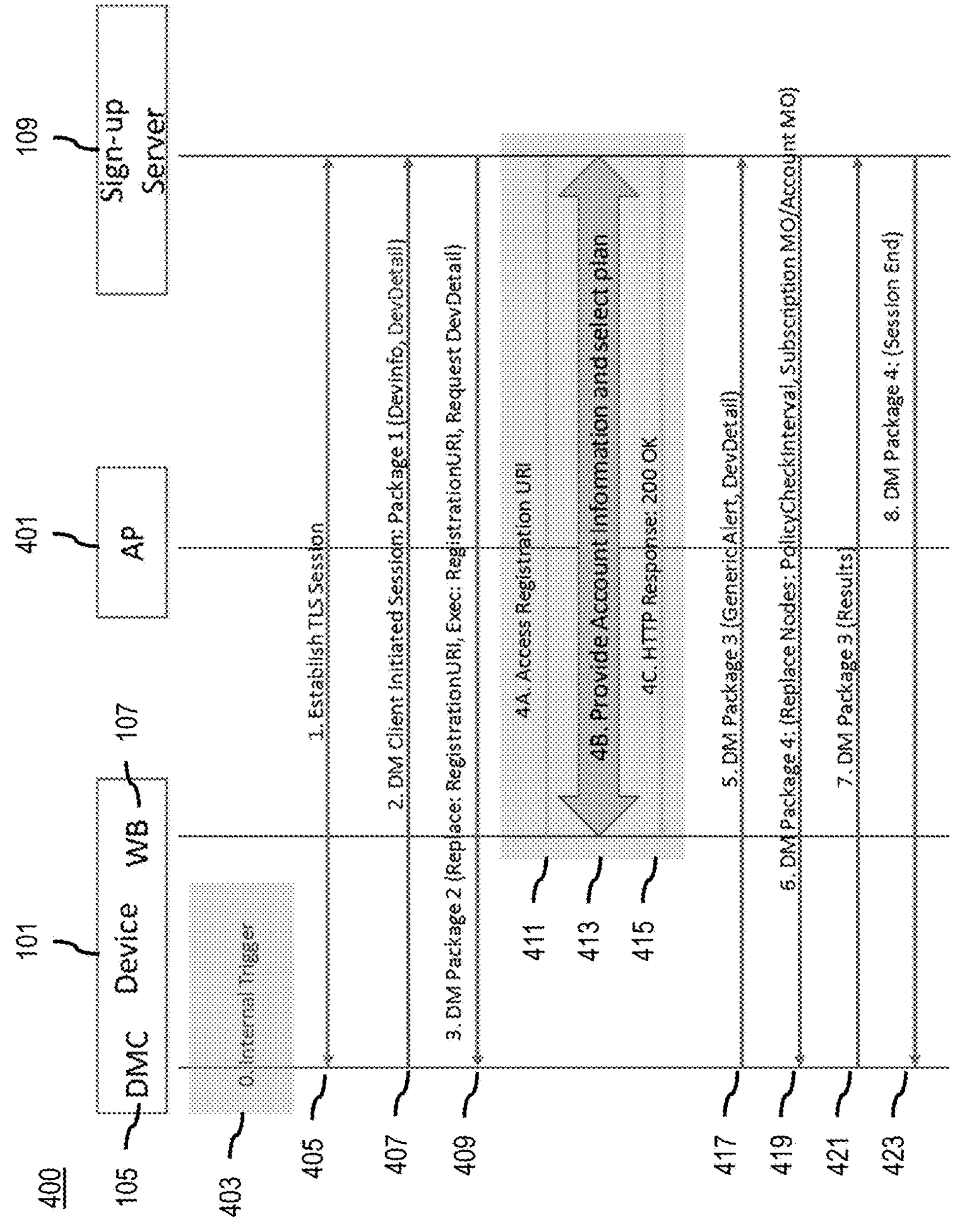
FIG. 4 is a ladder diagram that illustrates a sequence of messages and processes for client-initiated provisioning, according to one embodiment.

FIG. 4 is a ladder diagram that illustrates a sequence of messages and processes for client-initiated provisioning, according to one embodiment. FIG. 4 describes various embodiments of a client-initiated provisioning mechanism based on OMA DM as the end-to-end protocol for provisioning service. The processes represented in the diagram 400 include a device 101 (e.g., a UE 101) which further includes a device management client (DMC) 105 (e.g., a provisioning manager 105) and a web browser (WB) application 107. In addition, an access point (AP) 401 to a communication network 103 (e.g., a WiFi network) and a sign-up server 109 (e.g., a provisioning server 109) associated with the communication network 103 are depicted. Although the example of FIG. 4 is described with respect to provisioning in a WiFi network, various embodiments of the approach of FIG. 4 can be applied to other network provisioning scenarios including M2M, cognitive radio, home network, etc.

At step 403, an internal trigger (e.g., DM Package #0) is generated as a result of the device 101 trying to access a desired network 103 or AP 401 of the network 103. For example, this can be a result of the user manually selecting from one of the available networks 103 through a UI of the device 101. If the protocol used is OMA DM 1.3, the trigger can indicate if DevDetail (e.g., standard OMA DM Device Detail Management Object) should be include in step 407 below when the DMC 105 sends Package #1. In the case of WiFi, the user selects a desired hotspot from available hotspots.

At step 405, the device 101 initiates a TLS connection to the sign-up server 109 in accordance with the procedures for TLS (e.g., RFC 4346). In one embodiment, the device 101 obtains the address (e.g., a fully qualified domain name (FQDN)) of the sign-up server 109 through standard procedures native to the network 103. In the case of WiFi or wireless local area network (WLAN), it is the IEEE 802.11 procedures. In one embodiment, server-side authentication is negotiated between the device 101 and the server 109. In some cases, the device verifies that any security or authentication certificate presented by the server 109 has been signed by a trusted root or authority. If not, then the device 101 aborts the provisioning process.

At step 407, the DMC 105 in the device 101 initiates a DM session with Package #1 using, for instance, OMA DM protocols. By way of example, a Generic Alert is included in Package #1 to inform the server 109 that the request is for a new subscription and the registration of credentials. More specifically, the Generic Alert is indicated by specifying the "Alert Type" in the DM Generic Alert included in Package #1, e.g., the Alert Type carries information identifying the purpose of the session.

For example, in a WiFi network, a Generic Alert can be sent in Package #1 with Alert Type "org.wifialliance.hs20.provisioning.subscriptionregistration" indicating that the device 101 wishes to subscribe to the service and register credentials.

At step 409, the server 109 sends DM Package #2 to the device 101. For example, Package #2 carries a "Replace" command to set the value of "RegistrationURI" node in the DM tree. The value of this node is the URI to which the WB 107 of the device 101 should go when the Exec command launches the WB 107. In one embodiment, the "RegistrationURI" need not be fixed for all networks 103. For example, WiFi can use a different name for this node.

In addition to the Replace command, Package #2 will also carry a DM "Exec" command. The Exec command is specified to be executed on the "RegistrationURI." This would result in the device 101 launching the WB 107 to load the URI.

If the DM protocol version is 1.2 (OMA DM 1.2), Package #2 also includes a request for DevDetail. In OMA DM 1.3, the request for DevDetail can be sent in step 407 when the DMC sends Package #1 along with DevInfo.

At step 411, the device 101 executes the Exec command, which results in the WB 107 initiating a secure connection (e.g., an HTTPS connection) to the URI specified in step 409. Again, server-side authentication can be negotiated between the device 101 and the server 109. This brings the registration page to the user of the device 101 through the WB 107. In one embodiment, the registration page may be accessed through another application or process other than the WB 107 of the UE 101. For example, an M2M device may not include a WB 107. Instead, the M2M device may execute a client application to access the registration information.

At step 413, the device 101 and the server 109 exchange registration data as determined by the service provider or operator of the network 103. In one embodiment, registration data is exchanged using HTTPS. By way of example, registration data includes the data for initiating a subscription with the network 103. Such registration data typically includes personal identify of the device or user, a selection of a rate plan, a subscriber's contact information, payment method (e.g., credit card), and the like.

At step 415, the server 109 sends an HTTP Response, "200 OK". In one embodiment, the HTTP session (WB 107 session) ends and the DMC 105 is informed about the completion of the session. Although, in this example, the session is concluded based on the "200 OK" response, it is contemplated that the system 100 may use any method for indicating the end of the registration session depending on, for instance, the operating system platform, browser, or application. After receiving this indication, the DMC 105 can continue with the next steps to complete the client-initiated provisioning. By way of example, in this context, the "200 OK" status code for HTTP message indicates to the DMC 105 that its subscription has been created and that the subscription is ready to be fetched. In one embodiment, the subscription indicator can be carried in a cookie attached to the "200 OK" response, a vendor-specific header field, a newly defined content-type, or other mechanisms for conveying the indication of the status of the subscription creation. In one embodiment, a URI pointing to the created subscription MO may be sent along with the "200 OK" message, depending on the server side implementation.

At step 417, the DMC 105 sends Package #3, which includes DevDetail (e.g., for OMA DM 1.2) and a Generic Alert (e.g., including the URI to the created subscription, if present in the previously received "200 OK" message) to the server 109. In one embodiment, the DMC 105 maintains the same session as in step 409. By way of example, the Generic Alert indicates through the Alert Type and result code about the completion of the status of the Exec command in steps 411-415. In one embodiment, the this Generic Alert can be provided in a new session, where the first Generic Alert from the device 101 to the server 109 would include a "correlator" or other correlation identifier to the previous Generic Alert in the previous session. This would enable the server 109 to know that the new Generic Alert is a request to continue a previously started provisioning process even when the session is ended in the middle (e.g., after browser process of step 415).

For example, in the case of WiFi, the Alert Type can be "org.wifialliance.hs20.provisioning.subscription." An appropriate result code (e.g., success or failure) can be included indicating the status of the Exec command in steps 411-415.

At step 419, the server sends the Subscription MO and DM Account MO in Package #4. For example, the Subscription MO provides network specific configuration. In one embodiment, the Subscription MO can be defined based, at least in part, on network-specific needs, credentials, etc. In addition, the Account MO is the standard DMAcc MO specified by OMA DM, and is used to configure a Management Server for management operations. For example, management operations can include updating of the Subscription MO or other MOs related to the service, which are managed through the service provider or operator of the network 103. In one embodiment, after the basic service subscription, the server 109 can send further or additional MOs for various other services.

At step 421, the device 101 sends the results from the operation of step 419 in Package #3. The server 109 then ends the session when the client-initiated provisioning is complete (step 423).

FIGS. 5A-5D are diagrams of user interfaces utilized in the processes described with respect to FIGS. 1-4, according to various embodiments. FIG. 4A depicts a user interface (UI) 500 that provides a list of networks available to a UE 101 that is presenting or otherwise associated with the UI 500. As shown, the available networks include Alpha Cell Provider 501, Beta Cell Provider 503, and Gamma WiFi Hotspot 505. In this example, the user selects to access Alpha Cell Provider 501.

Figure 5B:
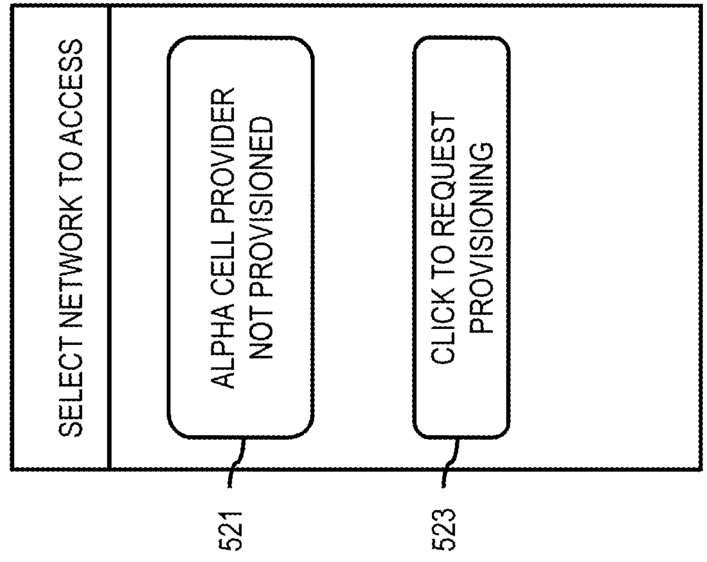
FIGS. 5A-5D are diagrams of user interfaces utilized in the processes described with respect to FIGS. 1-4, according to various embodiments.
Figure 5A:
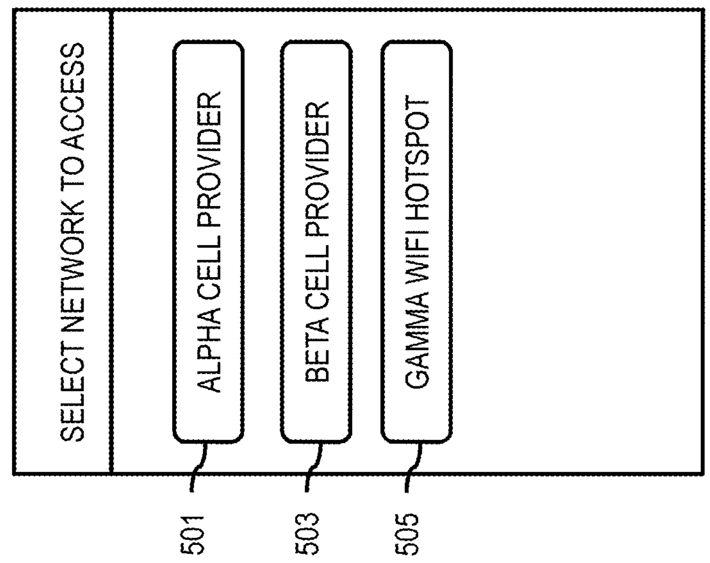
Figure 5C:
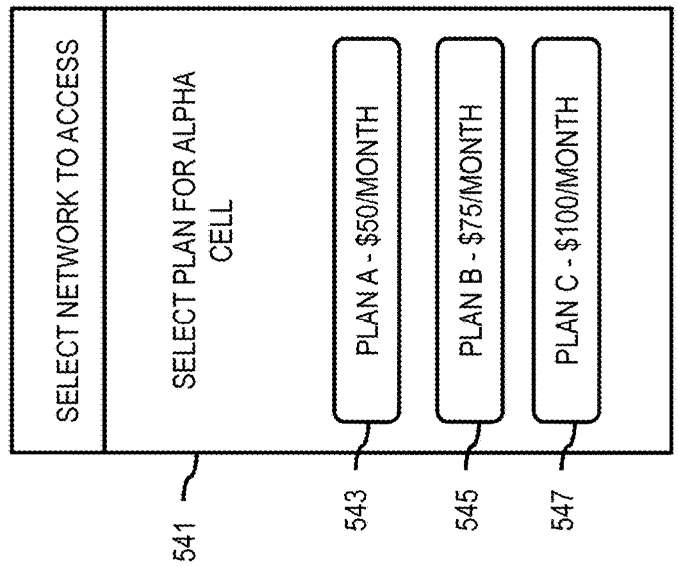
Figure 5D:
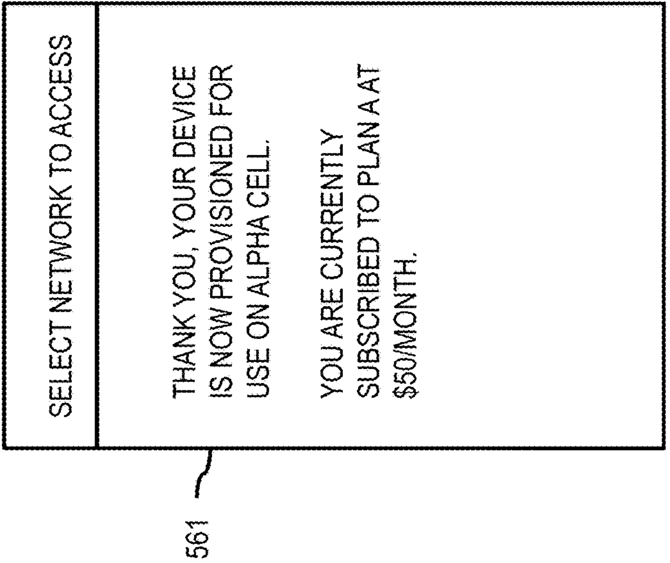

The provisioning manager 105 detects the attempt to access Alpha Cell Provider 501 and determines that the Alpha Cell Provider 501 has not been provisioned for the UE 101. Accordingly, a UI 520 of FIG. 5B is presented to provide an alert 521 that the Alpha Cell Provider 501 has not been provisioned and to provide an option 523 to provision the Alpha Cell Provider 501 according to various embodiments of the client-initiated provisioning process described herein.

In this example, the user selects to provision the Alpha Cell Provider 501. In response, the provisioning manager 105 initiates the client-initiated provisioning process and receives provisioning information from the corresponding provisioning server 109. This provisioning information is presented in the UI 540 of FIG. 5C. In one embodiment, the UI 540 is presented in a browser application 107 executing at the UE 101. As shown, the UI 540 presents provisioning information including plan selection information. More specifically, the UI 540 presents an alert 541 to instruct the user to select a plan for provisioning and provides options 543-547 of three different service plans.

As shown the user selects to provision service with the network 103 according to service plan 545. In response, the provisioning manager 105 presents a UI 560 of FIG. 5D to display a confirmation message 561 that the client-initiated provisioning process is complete. The confirmation message 561 also displays confirmation of the selected plan.

The processes described herein for client-initiated provisioning may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 6:
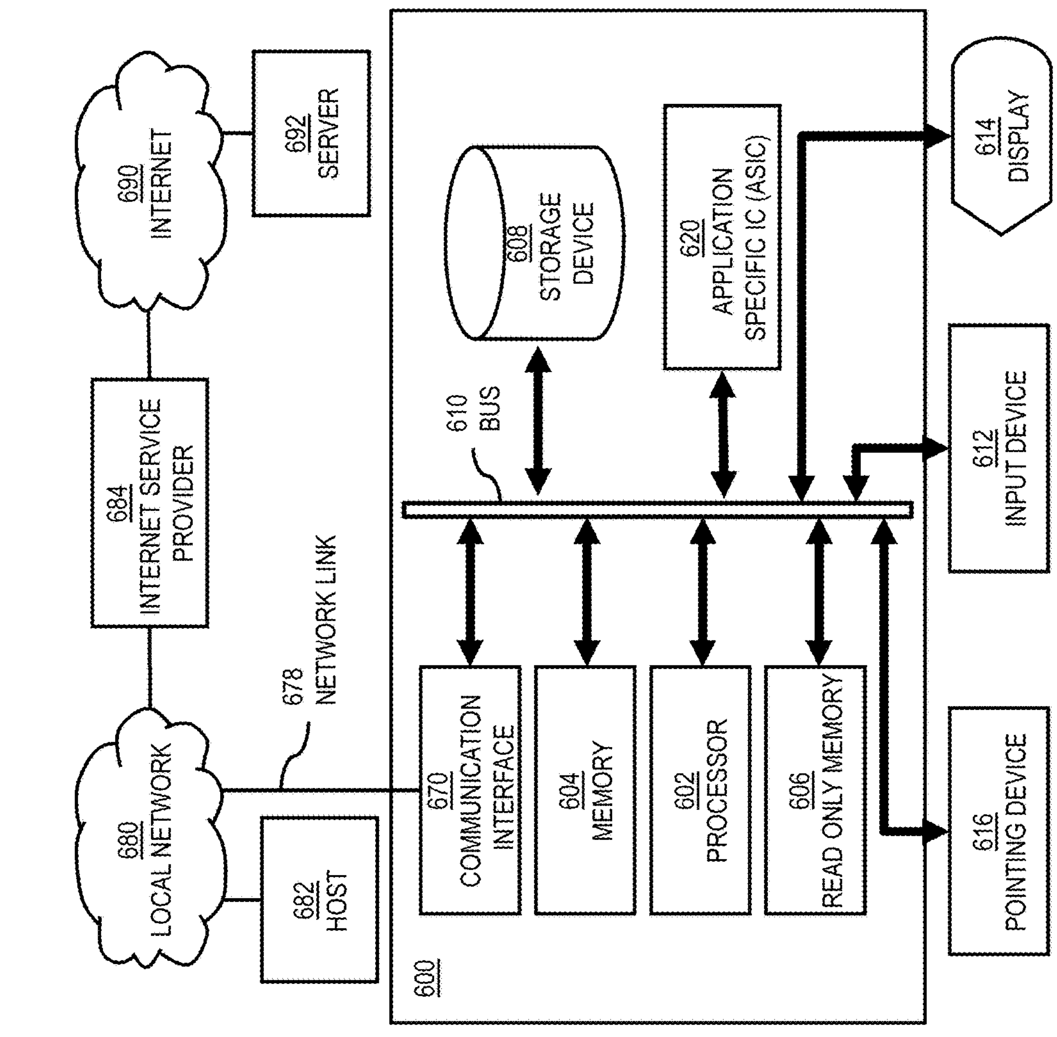
FIG. 6 is a diagram of hardware that can be used to implement an embodiment of the invention.
Figure 7:
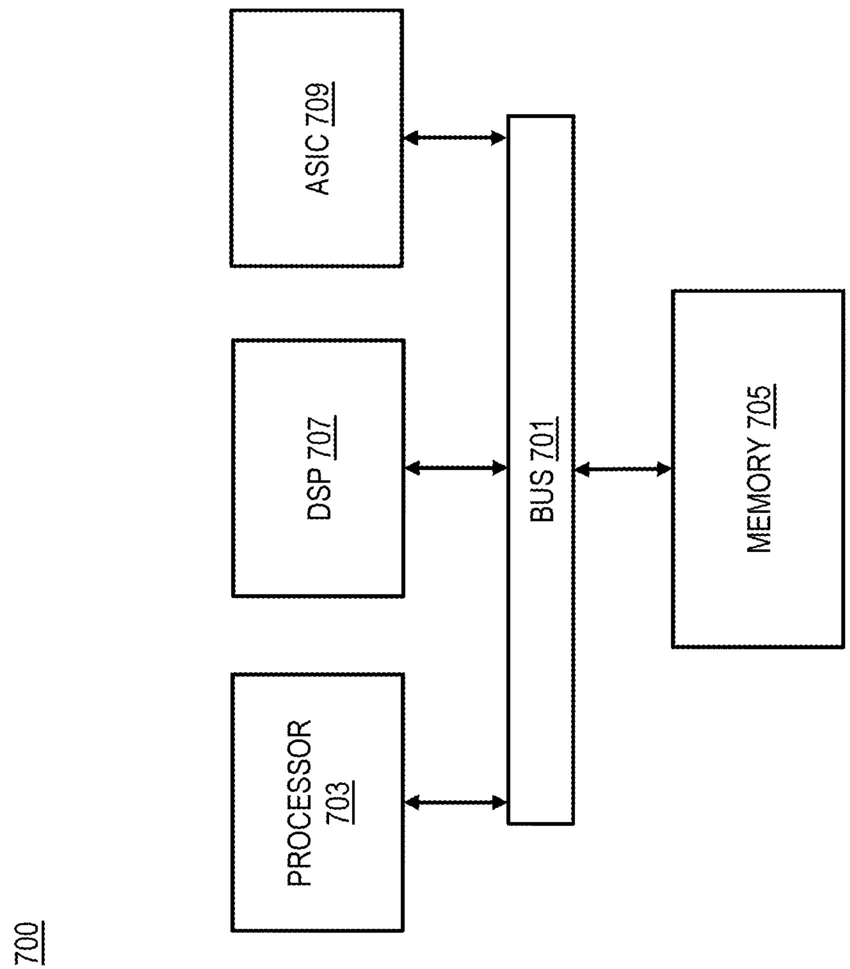
FIG. 7 is a diagram of a chip set that can be used to implement an embodiment of the invention.

FIG. 6 illustrates a computer system 600 upon which an embodiment of the invention may be implemented. Although computer system 600 is depicted with respect to a particular device or equipment, it is contemplated that other devices or equipment (e.g., network elements, servers, etc.) within FIG. 6 can deploy the illustrated hardware and components of system 600. Computer system 600 is programmed (e.g., via computer program code or instructions) to provide client-initiated provisioning as described herein and includes a communication mechanism such as a bus 610 for passing information between other internal and external components of the computer system 600. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 600, or a portion thereof, constitutes a means for performing one or more steps of client-initiated provisioning.

A bus 610 includes one or more parallel conductors of information so that information is transferred quickly among devices coupled to the bus 610. One or more processors 602 for processing information are coupled with the bus 610.

A processor (or multiple processors) 602 performs a set of operations on information as specified by computer program code related to client-initiated provisioning. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 610 and placing information on the bus 610. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 602, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 600 also includes a memory 604 coupled to bus 610. The memory 604, such as a random access memory (RAM) or any other dynamic storage device, stores information including processor instructions for client-initiated provisioning. Dynamic memory allows information stored therein to be changed by the computer system 600. RAM allows a unit of information stored at a location called a memory address to be stored and retrieved independently of information at neighboring addresses. The memory 604 is also used by the processor 602 to store temporary values during execution of processor instructions. The computer system 600 also includes a read only memory (ROM) 606 or any other static storage device coupled to the bus 610 for storing static information, including instructions, that is not changed by the computer system 600. Some memory is composed of volatile storage that loses the information stored thereon when power is lost. Also coupled to bus 610 is a non-volatile (persistent) storage device 608, such as a magnetic disk, optical disk or flash card, for storing information, including instructions, that persists even when the computer system 600 is turned off or otherwise loses power.

Information, including instructions for client-initiated provisioning, is provided to the bus 610 for use by the processor from an external input device 612, such as a keyboard containing alphanumeric keys operated by a human user, or a sensor. A sensor detects conditions in its vicinity and transforms those detections into physical expression compatible with the measurable phenomenon used to represent information in computer system 600. Other external devices coupled to bus 610, used primarily for interacting with humans, include a display device 614, such as a cathode ray tube (CRT), a liquid crystal display (LCD), a light emitting diode (LED) display, an organic LED (OLED) display, a plasma screen, or a printer for presenting text or images, and a pointing device 616, such as a mouse, a trackball, cursor direction keys, or a motion sensor, for controlling a position of a small cursor image presented on the display 614 and issuing commands associated with graphical elements presented on the display 614. In some embodiments, for example, in embodiments in which the computer system 600 performs all functions automatically without human input, one or more of external input device 612, display device 614 and pointing device 616 is omitted.

In the illustrated embodiment, special purpose hardware, such as an application specific integrated circuit (ASIC) 620, is coupled to bus 610. The special purpose hardware is configured to perform operations not performed by processor 602 quickly enough for special purposes. Examples of ASICs include graphics accelerator cards for generating images for display 614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 600 also includes one or more instances of a communications interface 670 coupled to bus 610. Communication interface 670 provides a one-way or two-way communication coupling to a variety of external devices that operate with their own processors, such as printers, scanners and external disks. In general the coupling is with a network link 678 that is connected to a local network 680 to which a variety of external devices with their own processors are connected. For example, communication interface 670 may be a parallel port or a serial port or a universal serial bus (USB) port on a personal computer. In some embodiments, communications interface 670 is an integrated services digital network (ISDN) card or a digital subscriber line (DSL) card or a telephone modem that provides an information communication connection to a corresponding type of telephone line. In some embodiments, a communication interface 670 is a cable modem that converts signals on bus 610 into signals for a communication connection over a coaxial cable or into optical signals for a communication connection over a fiber optic cable. As another example, communications interface 670 may be a local area network (LAN) card to provide a data communication connection to a compatible LAN, such as Ethernet. Wireless links may also be implemented. For wireless links, the communications interface 670 sends or receives or both sends and receives electrical, acoustic or electromagnetic signals, including infrared and optical signals, that carry information streams, such as digital data. For example, in wireless handheld devices, such as mobile telephones like cell phones, the communications interface 670 includes a radio band electromagnetic transmitter and receiver called a radio transceiver. In certain embodiments, the communications interface 670 enables connection to the communication network 105 for providing client-initiated provisioning to the UE 101.

The term "computer-readable medium" as used herein refers to any medium that participates in providing information to processor 602, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 608. Volatile media include, for example, dynamic memory 604. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 620.

Network link 678 typically provides information communication using transmission media through one or more networks to other devices that use or process the information. For example, network link 678 may provide a connection through local network 680 to a host computer 682 or to equipment 684 operated by an Internet Service Provider (ISP). ISP equipment 684 in turn provides data communication services through the public, world-wide packet-switching communication network of networks now commonly referred to as the Internet 690.

A computer called a server host 692 connected to the Internet hosts a process that provides a service in response to information received over the Internet. For example, server host 692 hosts a process that provides information representing video data for presentation at display 614. It is contemplated that the components of system 600 can be deployed in various configurations within other computer systems, e.g., host 682 and server 692.

At least some embodiments of the invention are related to the use of computer system 600 for implementing some or all of the techniques described herein. According to one embodiment of the invention, those techniques are performed by computer system 600 in response to processor 602 executing one or more sequences of one or more processor instructions contained in memory 604. Such instructions, also called computer instructions, software and program code, may be read into memory 604 from another computer-readable medium such as storage device 608 or network link 678. Execution of the sequences of instructions contained in memory 604 causes processor 602 to perform one or more of the method steps described herein. In alternative embodiments, hardware, such as ASIC 620, may be used in place of or in combination with software to implement the invention. Thus, embodiments of the invention are not limited to any specific combination of hardware and software, unless otherwise explicitly stated herein.

The signals transmitted over network link 678 and other networks through communications interface 670, carry information to and from computer system 600. Computer system 600 can send and receive information, including program code, through the networks 680, 690 among others, through network link 678 and communications interface 670. In an example using the Internet 690, a server host 692 transmits program code for a particular application, requested by a message sent from computer 600, through Internet 690, ISP equipment 684, local network 680 and communications interface 670. The received code may be executed by processor 602 as it is received, or may be stored in memory 604 or in storage device 608 or any other non-volatile storage for later execution, or both. In this manner, computer system 600 may obtain application program code in the form of signals on a carrier wave.

Various forms of computer readable media may be involved in carrying one or more sequence of instructions or data or both to processor 602 for execution. For example, instructions and data may initially be carried on a magnetic disk of a remote computer such as host 682. The remote computer loads the instructions and data into its dynamic memory and sends the instructions and data over a telephone line using a modem. A modem local to the computer system 600 receives the instructions and data on a telephone line and uses an infra-red transmitter to convert the instructions and data to a signal on an infra-red carrier wave serving as the network link 678. An infrared detector serving as communications interface 670 receives the instructions and data carried in the infrared signal and places information representing the instructions and data onto bus 610. Bus 610 carries the information to memory 604 from which processor 602 retrieves and executes the instructions using some of the data sent with the instructions. The instructions and data received in memory 604 may optionally be stored on storage device 608, either before or after execution by the processor 602.

FIG. 7 illustrates a chip set or chip 700 upon which an embodiment of the invention may be implemented. Chip set 700 is programmed to provide client-initiated provisioning as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 700 can be implemented in a single chip. It is further contemplated that in certain embodiments the chip set or chip 700 can be implemented as a single "system on a chip." It is further contemplated that in certain embodiments a separate ASIC would not be used, for example, and that all relevant functions as disclosed herein would be performed by a processor or processors. Chip set or chip 700, or a portion thereof, constitutes a means for performing one or more steps of providing user interface navigation information associated with the availability of functions. Chip set or chip 700, or a portion thereof, constitutes a means for performing one or more steps of client-initiated provisioning.

In one embodiment, the chip set or chip 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 700 includes merely one or more processors and some software and/or firmware supporting and/or relating to and/or for the one or more processors.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to provide client-initiated provisioning. The memory 705 also stores the data associated with or generated by the execution of the inventive steps.

Figure 8:
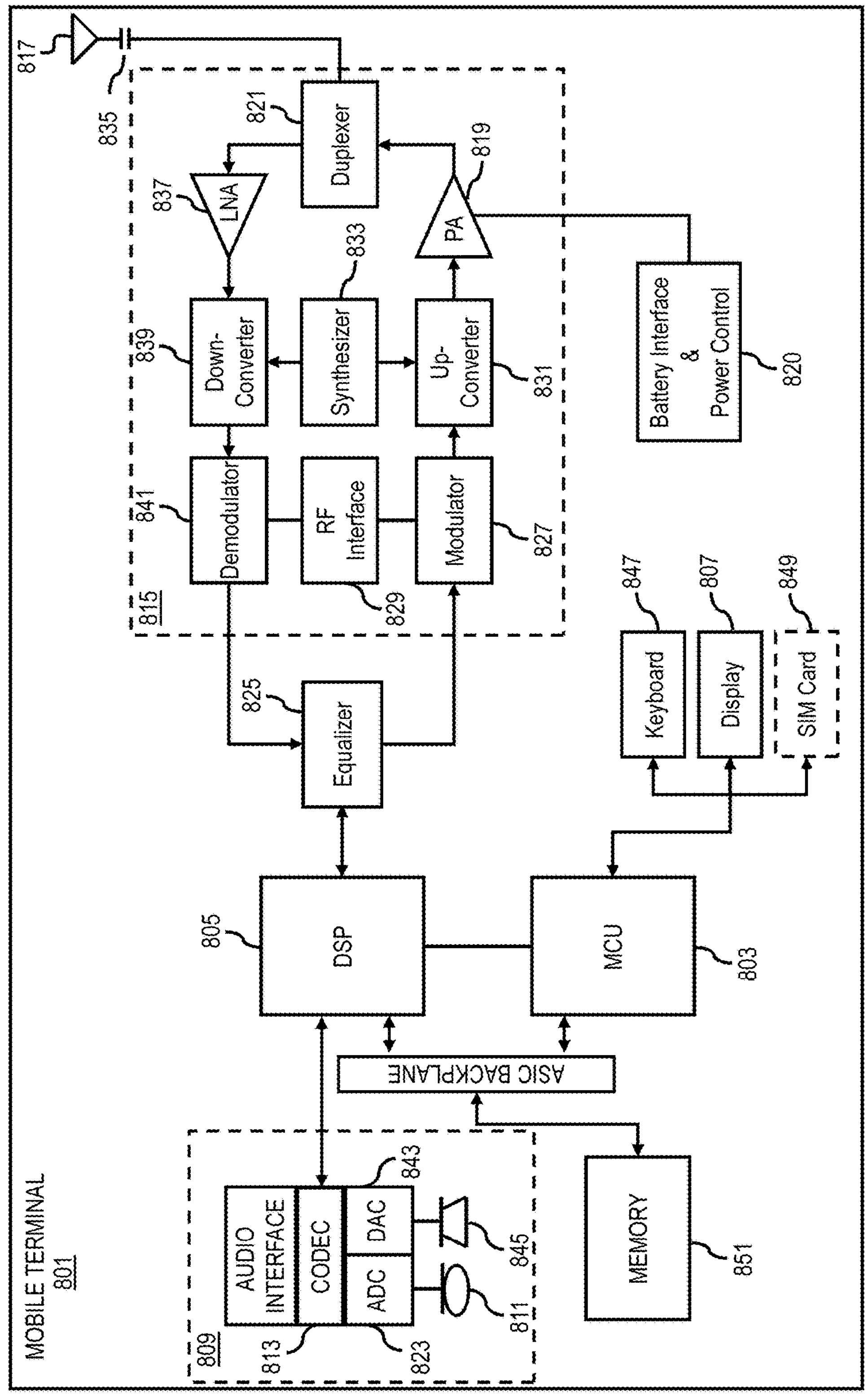
FIG. 8 is a diagram of a mobile station (e.g., handset) that can be used to implement an embodiment of the invention.

FIG. 8 is a diagram of exemplary components of a mobile terminal (e.g., handset) for communications, which is capable of operating in the system of FIG. 1, according to one embodiment. In some embodiments, mobile terminal 801, or a portion thereof, constitutes a means for performing one or more steps of client-initiated provisioning. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 803, a Digital Signal Processor (DSP) 805, and a receiver/transmitter unit including a microphone gain control unit and a speaker gain control unit. A main display unit 807 provides a display to the user in support of various applications and mobile terminal functions that perform or support the steps of client-initiated provisioning. The display 807 includes display circuitry configured to display at least a portion of a user interface of the mobile terminal (e.g., mobile telephone). Additionally, the display 807 and display circuitry are configured to facilitate user control of at least some functions of the mobile terminal. An audio function circuitry 809 includes a microphone 811 and microphone amplifier that amplifies the speech signal output from the microphone 811. The amplified speech signal output from the microphone 811 is fed to a coder/decoder (CODEC) 813.

A radio section 815 amplifies power and converts frequency in order to communicate with a base station, which is included in a mobile communication system, via antenna 817. The power amplifier (PA) 819 and the transmitter/modulation circuitry are operationally responsive to the MCU 803, with an output from the PA 819 coupled to the duplexer 821 or circulator or antenna switch, as known in the art. The PA 819 also couples to a battery interface and power control unit 820.

In use, a user of mobile terminal 801 speaks into the microphone 811 and his or her voice along with any detected background noise is converted into an analog voltage. The analog voltage is then converted into a digital signal through the Analog to Digital Converter (ADC) 823. The control unit 803 routes the digital signal into the DSP 805 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 825 for compensation of any frequency-dependent impairments that occur during transmission though the air such as phase and amplitude distortion. After equalizing the bit stream, the modulator 827 combines the signal with a RF signal generated in the RF interface 829. The modulator 827 generates a sine wave by way of frequency or phase modulation. In order to prepare the signal for transmission, an up-converter 831 combines the sine wave output from the modulator 827 with another sine wave generated by a synthesizer 833 to achieve the desired frequency of transmission. The signal is then sent through a PA 819 to increase the signal to an appropriate power level. In practical systems, the PA 819 acts as a variable gain amplifier whose gain is controlled by the DSP 805 from information received from a network base station. The signal is then filtered within the duplexer 821 and optionally sent to an antenna coupler 835 to match impedances to provide maximum power transfer. Finally, the signal is transmitted via antenna 817 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 801 are received via antenna 817 and immediately amplified by a low noise amplifier (LNA) 837. A down-converter 839 lowers the carrier frequency while the demodulator 841 strips away the RF leaving only a digital bit stream. The signal then goes through the equalizer 825 and is processed by the DSP 805. A Digital to Analog Converter (DAC) 843 converts the signal and the resulting output is transmitted to the user through the speaker 845, all under control of a Main Control Unit (MCU) 803 which can be implemented as a Central Processing Unit (CPU) (not shown).

The MCU 803 receives various signals including input signals from the keyboard 847. The keyboard 847 and/or the MCU 803 in combination with other user input components (e.g., the microphone 811) comprise a user interface circuitry for managing user input. The MCU 803 runs a user interface software to facilitate user control of at least some functions of the mobile terminal 801 to provide client-initiated provisioning. The MCU 803 also delivers a display command and a switch command to the display 807 and to the speech output switching controller, respectively. Further, the MCU 803 exchanges information with the DSP 805 and can access an optionally incorporated SIM card 849 and a memory 851. In addition, the MCU 803 executes various control functions required of the terminal. The DSP 805 may, depending upon the implementation, perform any of a variety of conventional digital processing functions on the voice signals. Additionally, DSP 805 determines the background noise level of the local environment from the signals detected by microphone 811 and sets the gain of microphone 811 to a level selected to compensate for the natural tendency of the user of the mobile terminal 801.

The CODEC 813 includes the ADC 823 and DAC 843. The memory 851 stores various data including call incoming tone data and is capable of storing other data including music data received via, e.g., the global Internet. The software module could reside in RAM memory, flash memory, registers, or any other form of writable storage medium known in the art. The memory device 851 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 849 carries, for instance, important information, such as the cellular phone number, the carrier supplying service, subscription details, and security information. The SIM card 849 serves primarily to identify the mobile terminal 801 on a radio network. The card 849 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method for gaining access to a network based on provisioning a client device, the method comprising:

detecting, utilizing at least one interface of the client device, one or more networks available at a location of the client device, wherein the one or more networks include one or more WIFI networks, one or more cellular networks, one or more cognitive radio networks, or a combination thereof, and wherein the client device includes no prior information required for a provisioning of at least one of the one or more networks;

selecting a network from among the one or more networks based on a user input, a user preference, or a combination thereof;

determining trigger information associated with a client-based trigger configured to initiate requesting a provisioning of the client device to enable access to the selected network, wherein the client-based trigger is an attempt to access the selected network, wherein the attempt is associated with the requesting of the provisioning of the client device, and wherein the provisioning is configured to include subscription information of a subscription to access the network;

determining the trigger information to include metadata in the client-based trigger, a provisioning request, or a combination thereof, wherein the metadata provides, at least in part, information on a purpose of the client-based trigger, the provisioning request, or a combination thereof;

processing, utilizing at least one processor of the client device, the client-based trigger to generate the provisioning request configured to result in the provisioning of the client device, the provisioning request including a selection, associated with the subscription to access the network, to subscribe to one of a plurality of rate plans, a subscription payment method, or a combination thereof;

transmitting the provisioning request to a network node of the network, wherein the network node is a WIFI access point, a gateway of one or more machine to machine devices, or a home network gateway;

receiving, from the network node, network provisioning information in response to the provisioning request; and processing the network provisioning information to gain access to the network according to a rate plan, a subscription payment method, or a combination thereof based on the selection associated with the subscription.

2. The method of claim 1, wherein the metadata is provided in a standardized format, and wherein the provisioning request further includes an identify of the client device, identify of a user of the client device, or a combination thereof.

3. The method of claim 1, wherein the network provisioning information includes, at least in part, a registration universal resource identifier (URI), and the method further comprising:

directing a browser application executing at the client device to the registration URI; and initiating an exchange of registration data between the client device and a provisioning server through the browser application, wherein access to the network is based, at least in part, on the registration data.

4. The method of claim 3, wherein the registration data includes, at least in part, identity information of the client device, identity information of a user of the client device, a selection of a rate plan, account information, payment information, or a combination thereof.

5. The method of claim 1, wherein the network provisioning information includes status information with respect to creation of the subscription for access to the network, further comprising:

determining a location of the status information; and initiating a retrieval of the status information from the location to gain access to the network.

6. The method of claim 1, further comprising:

associating the client-based trigger, the provisioning request, the network provisioning information, or a combination thereof with at least one correlation identifier, wherein the correlation identifier facilitates identification of the client-based trigger, the provisioning request, the network provisioning information, or a combination thereof across a plurality of provisioning sessions.

7. The method of claim 1, further comprising:

initiating a presentation of the one or more networks on a user interface of the client device;

displaying a prompt for user selection of one of the one or more networks; and processing the network provisioning information to gain access to one or more services of the network.

8. The method of claim 7, further comparing:

scanning at the location one or more service set identifiers of one or more networks that are periodically broadcasted in a beacon transmission; and including the one or more service set identifiers of the one or more networks in the presentation, wherein the client device includes no prior information related to a provisioning of the network.

9. The method of claim 1, further comprising:

initiating a connection between the client device and a provisioning server;

determining authentication credentials over the connection; and processing the authentication credentials to determine one or more credential types, wherein the provisioning request includes information regarding an identity, one or more or characteristics, one or more capabilities, or a combination thereof of the client device, and wherein the network provisioning information is based, at least in part, on the one or more credential types.

10. An apparatus embedded in a client device for gaining access to a network based on provisioning a client device, the apparatus comprising:

at least one processor; and at least one memory including computer program code for one or more programs, the at least one memory and the computer program code configured to, with the at least one processor, cause the apparatus embedded in the client device to perform at least the following, detect one or more networks available at a location of the client device, wherein the one or more networks include one or more WIFI networks, one or more cellular networks, one or more cognitive radio networks, or a combination thereof, and wherein the client device includes no prior information required for a provisioning of at least one of the one or more networks;

select a network from among the one or more networks based on a user input, a user preference, or a combination thereof;

determine trigger information associated with a client-based trigger configured to initiate requesting a provisioning of the client device to enable access to the selected network, wherein the client-based trigger is an attempt to access the selected network, wherein the attempt is associated with the requesting of the provisioning of the client device, and wherein the provisioning is configured to include subscription information of a subscription to access the network;

determine the trigger information to include metadata in the client-based trigger, a provisioning request, or a combination thereof, wherein the metadata provides, at least in part, information on a purpose of the client-based trigger, the provisioning request, or a combination thereof;

process the client-based trigger to generate the provisioning request configured to result in the provisioning of the client device, the provisioning request including a selection, associated with the subscription to access the network, to subscribe to one of a plurality of rate plans, a subscription payment method, or a combination thereof;

transmit the provisioning request to a network node of the network, wherein the network node is a WIFI access point, a gateway of one or more machine to machine devices, or a home network gateway;

receive, from the network node, network provisioning information in response to the provisioning request; and process the network provisioning information to gain access to the network according to a rate plan, a subscription payment method, or a combination thereof based on the selection associated with the subscription.

11. The method of claim 10, wherein the metadata is provided in a standardized format, and wherein the provisioning request further includes an identify of the client device, identify of a user of the client device, or a combination thereof.

12. The apparatus of claim 10, wherein the network provisioning information includes, at least in part, a registration universal resource identifier (URI), and wherein the apparatus is further caused to:

direct a browser application executing at the client device to the registration URI; and initiate an exchange of registration data between the client device and a provisioning server through the browser application, wherein access to the network is based, at least in part, on the registration data.

13. The apparatus of claim 12, wherein the registration data includes, at least in part, identity information of the client device, identity information of a user of the client device, a selection of a rate plan, account information, payment information, or a combination thereof.

14. The apparatus of claim 10, wherein the network provisioning information includes status information with respect to creation of the subscription for access to the network, and wherein the apparatus is further caused to:

determine a location of the status information; and initiate a retrieval of the status information from the location to gain access to the network.

15. The apparatus of claim 10, wherein the apparatus is further caused to:

associate the client-based trigger, the provisioning request, the network provisioning information, or a combination thereof with at least one correlation identifier, wherein the correlation identifier facilitates identification of the client-based trigger, the provisioning request, the network provisioning information, or a combination thereof across a plurality of provisioning sessions.

16. The apparatus of claim 10, wherein the apparatus is further caused to:

process the network provisioning information to gain access to one or more services of the network.

17. The apparatus of claim 10, wherein the apparatus is further caused to:

initiate a connection between the client device and the provisioning server;

determine authentication credentials over the connection; and process the authentication credentials to determine one or more credential types, wherein the provisioning request includes information regarding an identity, one or more or characteristics, one or more capabilities, or a combination thereof of the client device, and wherein the network provisioning information is based, at least in part, on the one or more credential types.

18. The apparatus of claim 10, wherein the client device includes no prior information related to a provisioning of the network.

* * * * *